Patented Mar. 15, 1938

2,110,881

UNITED STATES PATENT OFFICE 2,110,881

MANUFACTURE OF CATALYTIC MATERIAL SUITABLE FOR THE VAPOR PHASE HYDRATION OF OLEFINES

Walter Philip Joshua, Cheam, Herbert Muggleton Stanley, Tadworth, and John Blair Dymock, Sutton, England No Drawing. Application May 14, 1935,
Serial No. 21,478

10 Claims. (Cl. 23—237)

This invention relates to the manufacture of catalytic material suitable for the vapor phase hydration of olefines by steam under pressure.

In the hydration of olefines there are certain limitations from the technical standpoint. In particular the use of certain metals in the construction of the apparatus employed should be avoided either because they are liable to be attacked, especially if a liquid acid catalyst is used, or because they themselves exert an undesired catalytic effect. The employment of solid catalysts is preferable to liquid catalysts not only because of the corrosive action of the latter but also because of the difficulty of maintaining liquid catalysts at constant catalytic strength if continuous operation with constant yield is aimed at. On the other hand solid catalysts are liable to be detrimentally affected as to their physical condition by steam under pressure and if they disintegrate their catalytic efficiency is reduced and difficulties in plant operation are encountered.

It is therefore the principal object of the present invention to provide a catalytic material for hydration of olefines that will maintain its physical characteristics as a solid and its efficiency as a catalyst for long periods of continuous use under the conditions required in olefine vapor phase hydration processes.

More specifically stated, an object of the present invention is to provide a hydration catalyst so compounded that while under operating conditions it is substantially non-corrosive to metals, especially steel. From this aspect the catalytic composition provided by the present invention is one in which has been incorporated during its manufacture a constituent or constituents that render the finished catalyst non-corrosive under operating conditions.

A further object is to provide a hydration catalytic composition in solid form that has disseminated throughout each pellet granule or other solid piece of the material a constituent that confers mechanical stability on the catalyst under operating conditions.

A still further object of the invention is to provide a solid catalytic material in the form of tablets, pellets, or other solid pieces compacted in a press or by extrusion or otherwise and containing throughout their structure a mechanically stabilizing carbonaceous skeleton. More particularly the mechanically stabilizing carbonaceous skeleton is produced in situ by carbonization of an organic constituent incorporated in the actual catalytic material during its preparation or during the manufacture of the pellets, tablets or other pieces. The organic constituent may be a water soluble substance and be incorporated in aqueous solution with the catalytic material, or it may be incorporated as a dispersion in water, the water serving to ensure thorough dispersion and also functioning during the subsequent carbonization step to ensure penetration of the carbonizing action to the centre of each pellet or other compacted piece of the composition. In compounding the above-mentioned ingredients a binder may be employed in an amount up to 20 per cent. of the dry weight of the catalytic material, preferably a drying oil such as linseed oil or tung oil that also supplies carbonaceous residue when carbonized under certain circumstances as when used in conjunction with phosphoric acid as hereinafter mentioned. As an alternative to incorporation of the water or aqueous solution or dispersion containing the organic constituent at one stage and of the oil at a second stage these stages may be combined by making an emulsion of the oil with the water or aqueous solution. If desired a dispersion accelerator such as acetone or other water soluble organic compound may also be employed.

A still further object is to provide a vapor phase olefine hydration catalyst having the physical properties of non-corrosiveness and sustained structural stability under operating conditions combined with the catalytic advantages of containing acid radicals especially phosphoric acid radicals and preferably containing both metallic phosphate and phosphoric acid, since such catalytic material is highly satisfactory for continuous vapor phase hydration of olefines on a commercial scale when it can be used without attacking the reaction plant and without itself deteriorating in structural and catalytic properties.

The invention is particularly but not exclusively applicable to the preparation of olefine hydration catalysts compounded from a compound or compounds of uranium, boron, copper, iron, manganese, cobalt, calcium, barium, strontium and magnesium, wherein the amount of phosphoric acid employed in their preparation is in excess of that required to form the orthophosphate or orthophosphates of the elements involved.

The above-mentioned and other objects and features of the present invention will be apparent from the following description of two examples of the manner in which the invention is carried into effect.

However before describing these examples it may be pointed out that the vapor phase hydration of olefines by means of water vapor using solid catalysts containing metal phosphates and excess phosphoric acid stabilized by the residue of certain carbonaceous materials admixed and carbonized is disclosed per se in the specification of our co-pending application Ser. No. 707,416.

Example I

A catalytic composition was first prepared by making a suspension of manganese carbonate and boric anhydride in water and adding thereto phosphoric acid (as $H_3PO_4$), these constituents being in the ratio of 3.2 mols of the acid to 1 mol. of the carbonate and 0.5 mol. of the boric anhydride whereby there is formed a complex of manganese phosphate and boron phosphate and phosphoric acid in excess of that required to form the normal phosphates of the boron and manganese. This solution was evaporated down to dryness and broken into small pieces and heated at 250° C. for 2 hours. The dried pieces were then ground to a fine powder and graded and the graded powder was again dried at 250° C. for 2 hours. 600 grams of the dry powder were then mixed intimately with a solution of 6 grams of sucrose in 40 grams of water, and then with 70 grams of tung oil dissolved in an equal volume of petroleum ether. Instead of making a dry powder by heating before adding the sucrose a certain amount of water (as hereinafter specified) might be left in the mass during the evaporation stage but the advantage of thoroughly drying before adding the sucrose solution is that the minimum amount of water contained in the mass before the final heating or carbonization is then more accurately known and moreover the complete drying facilitates the grinding and grading. It has been found that in order to secure the most thorough carbonization the amount of water present should not be less than 2 per cent. by weight of the dry catalytic material. The amount of water added in this example is in excess of 2 per cent. and the resulting mass is fit for a moulding operation, preferably extrusion. Obviously, however, the mass instead of being extruded might be tabletted in which case the water and oil content must be adjusted (somewhat less than for extrusion) to facilitate that operation. An excess of water would merely entail wasteful evaporation. A knowledge of the appropriate amount for each circumstance is readily acquired by experience. The resulting mass in the present instance was extruded through a 6 millimetre die and cut into rods about 10 millimetres long. The resultant short rod-like catalytic material was then again heated slowly to 250° C. and maintained at that temperature for two hours to effect carbonization. The catalytic material so prepared was very hard and durable and was physically homogeneous, the body of each piece being black in appearance throughout due to the skeleton of carbon residue resulting from the carbonization of the sucrose and the tung oil. Vapor phase hydration of ethylene by the use of this material was carried on continuously in a steel vessel by passing ethylene and steam in the ratio of 3 mols to 1 mol. under a total pressure of 40 atmospheres over 1 litre of the catalytic material maintained at a temperature of 260° C. at a rate of about 20,000 litres per hour of the ethylene (measured at normal temperature and pressure). The hourly output of alcohol was 410 grams in the form of a 7.2 per cent. aqueous condensate. Only negligible quantities of polymers and acetaldehyde were formed. After a prolonged period of operation the fragments of catalyst were still catalytically active and structurally stable and the reaction vessel showed no signs of corrosion.

Example II

A catalytic composition was prepared in the manner described in Example I but in the ratio of 2.8 mols of phosphoric acid (as $H_3PO_4$) to 1 mol. of manganese carbonate and 0.5 mol. of boric anhydride.

With 1000 grams of the dry graded powder was intimately mixed first a solution of 10 grams of sucrose in 60 grams of water and then 130 grams of tung oil dissolved in an equal volume of petroleum ether. After a thorough mixing of the resulting mass 50 grams of water were added. The added water is required in this case because the acidity of the catalytic material is less than in Example I. The mass was then extruded through a die 6 millimetres in diameter and was cut into short lengths and heated slowly to 250° C. at which temperature it was maintained for 2 hours to ensure thorough carbonization throughout the body of each fragment. Under the same conditions of hydration of ethylene as in Example I, the alcohol output per litre of catalyst was 300 grams per hours in the form of a 6.1 per cent. aqueous distillate. After a prolonged period of operation the catalyst was still catalytically active and structurally stable and the reaction vessel showed no signs of corrosion.

After forming the constituents into compacted piece as by tabletting or by extrusion and cutting into short lengths, the compacted pieces may be matured for several hours by heating at a temperature of only about 100° C. to 150° C. before subjecting them to the higher temperature mentioned, namely 250° C.

The procedure set out in the above examples is of course capable of various modifications. For example, although the employment of tung oil in petroleum ether has been mentioned as the binder which serves also as a provider of residual carbon during carbonization, we may employ linseed oil instead of tung oil or a mixture of linseed oil and tung oil which are mentioned in our copending application Ser. No. 692,222 or a vegetable non-drying oil such as castor oil or rape oil, or a purified animal oil particularly an oil containing unsaturated radicals such as whale oil, or an aliphatic alcohol or acid of high molecular weight such as cetyl alcohol or stearic acid or derivatives thereof which are mentioned in our copending application Ser. No. 738,158. Instead of petroleum ether we may use any other suitable volatile solvent preferably a completely volatile organic solvent such as benzene, and instead of sucrose as the organic constituent to provide the carbon skeleton in the finished catalyst we may employ, for example, glucose, fructose, molasses, starch, gelatine, pectin, and higher alcohols such as glycerol and mannitol which are mentioned in our copending application Ser. No. 707,416. The organic constituent employed to form the carbon skeleton need not be capable of forming a solution or even a colloidal solution provided it is capable of giving the desired carbonaceous structure under the conditions of preparation of the catalyst; for example, proteins such as casein insoluble in water may be used or cellulosic material or cellulose derivatives such as cellulose esters or ethers.

What we claim is:—

1. A process of manufacturing catalytic material in solid pieces capable of remaining mechanically stable when used for the vapor phase hydration of olefines by means of steam under pressure, comprising preparing a mouldable mixture of a metallic acid phosphate, a binder, a carbonizable constituent, and a quantity of water equal to not less than about 2 per cent. of the dry weight of the catalytic material, compacting the material into solid pieces, and heating them sufficiently to produce a mechanically stabilizing carbonaceous skeleton throughout each piece.

2. A process of manufacturing catalytic material in solid pieces capable of remaining mechanically stable when used for the vapor phase hydration of olefines by means of steam under pressure, comprising preparing a mouldable mixture of a metallic acid phosphate, a drying oil, a readily carbonizing organic compound, and a quantity of water equal to not less than about 2 per cent. of the dry weight of the catalytic material, compacting the mixture into solid pieces, and heating them sufficiently to produce a mechanically stabilizing carbon skeleton throughout each piece.

3. A process of manufacturing catalytic material in solid pieces capable of remaining mechanically stable when used for the vapor phase hydration of olefines by means of steam under pressure, comprising heating a mixture of an acid decomposable compound of an element taken from the group consisting of uranium, boron, copper, iron, manganese, cobalt, barium, calcium, strontium, magnesium, with an excess of phosphoric acid beyond that required to form the ortho-phosphate of said element or elements, grinding and again heating the mass, converting the same into a mouldable mass by admixing therewith a drying oil, an easily carbonized carbonaceous material, and a quantity of water equal to not less than about 2 per cent. of the dry weight of the catalytic material, compacting the mouldable mass into small solid pieces, and heating them sufficiently to cause carbonization throughout each piece.

4. A process of manufacturing catalytic material in solid pieces capable of remaining mechanically stable when used for the vapor phase hydration of olefines by means of steam under pressure, comprising heating a mixture of an acid decomposable compound of an element taken from the group consisting of uranium, boron, copper, iron, manganese, barium, cobalt, calcium, strontium, magnesium, with an excess of phosphoric acid beyond that required to form the orthophosphate of said element or elements, grinding and again drying the mass, converting the same into a mouldable mass by admixing therewith a drying oil and adding also a dispersion of a readily carbonizing organic compound in a quantity of water not less than about 2 per cent. of the dry weight of the catalytic material, compacting the mouldable mass into small solid pieces, and heating them sufficiently to cause carbonization throughout each piece.

5. A process of manufacturing catalytic material in solid pieces capable of remaining mechanically stable when used for the vapor phase hydration of olefines by means of steam under pressure, comprising heating a mixture of an acid decomposable compound of an element taken from the group consisting of uranium, boron, copper, iron, manganese, cobalt, barium, calcium, strontium, magnesium, with an excess of phosphoric acid beyond that required to form the orthophosphate of said element or elements, grinding and again heating the mass, converting the same into a mouldable mass by admixing therewith an emulsion of a drying oil and a solution of readily carbonizing organic matter in a quantity of water not less than about 2 per cent. of the dry weight of the catalytic material, compacting the mouldable mass into small solid pieces, and heating them sufficiently to cause carbonization throughout each piece.

6. A process of manufacturing catalytic material in solid pieces capable of remaining mechanically stable when used for the vapor phase hydration of olefines by means of steam under pressure, comprising heating a mixture of an acid decomposable compound of an element taken from the group consisting of uranium, boron, copper, iron, manganese, cobalt, barium, calcium, strontium, magnesium, with an excess of phosphoric acid beyond that required to form the orthophosphate of said element or elements, grinding and again heating the mass, converting the same into a mouldable mass by admixing therewith a drying oil, an easily carbonizing organic material, a quantity of water equal to not less than about 2 per cent. of the dry weight of the catalytic material, and a water dispersing agent, compacting the mouldable mass into small solid pieces, and heating them sufficiently to cause carbonization throughout each piece.

7. A process of manufacturing catalytic material in solid pieces capable of remaining mechanically stable when used for the vapor phase hydration of olefines by means of steam under pressure, comprising heating a mixture of an acid decomposable compound of an element taken from the group consisting of uranium, boron, copper, iron, manganese, cobalt, calcium, barium, strontium, magnesium, with an excess of phosphoric acid beyond that required to form the orthophosphate of said element or elements, grinding and again heating the mass, converting the same into a mouldable mass by admixing therewith a drying oil, an easily carbonizing organic material, and a quantity of water equal to not less than about 2 per cent. of the dry weight of the catalytic material, extruding the mouldable mass through a die, cutting the extruded material into fragments, and heating them sufficiently to cause carbonization throughout each fragment.

8. A process of treating material compounded from a base and phosphoric acid in excess of that required to form the orthophosphate of said base so as to render it mechanically stable when used in the vapor phase catalytic hydration of olefines by means of steam under pressure, comprising reducing the material to a dry powder, admixing therewith drying oil to form a mouldable mass, also admixing therewith a readily carbonizing organic material and a quantity of water equal to at least 2 per cent. of the dry weight of the catalytic material, moulding the mass into small pieces, and baking the same to effect carbonization throughout of the carbonizable material.

9. A process of treating material compounded from a base and phosphoric acid in excess of that required to form the orthophosphate of said base so as to render it mechanically stable when used in the vapor phase catalytic hydration of olefines by means of steam under pressure, comprising reducing the material to a dry powder, admixing therewith drying oil to form a mouldable mass, also admixing therewith a solution of a water-soluble readily carbonizing organic material in a quantity of water equal to at least 2 per cent. of the dry weight of the catalytic material, also incorporating in the mass a volatile organic liquid as a dispersing agent for said solution, moulding the mass into small pieces, and baking the same to effect carbonization throughout of the carbonizable material.

10. A process of treating material compounded from a base and phosphoric acid in excess of that required to form the orthophosphate of said base so as to render it mechanically stable when used in the vapor phase catalytic hydration of olefines by means of steam under pressure comprising reducing the material to a dry powder, admixing therewith sufficient of a dispersion of a drying oil in a volatile organic solvent therefor to form a mouldable mass, also admixing therewith a readily carbonizing organic material and a quantity of water equal to at least 2 per cent. of the dry weight of the catalytic material, moulding the mass into small pieces, and baking the same to effect carbonization throughout of the carbonizable material.

WALTER PHILIP JOSHUA.
HERBERT MUGGLETON STANLEY.
JOHN BLAIR DYMOCK.